US012785961B2

(12) United States Patent
Ganju et al.

(10) Patent No.: US 12,785,961 B2
(45) Date of Patent: Nov. 3, 2026

(54) SYSTEMS, METHODS, AND APPARATUSES FOR SECURING OWNERSHIP OF OBJECTS IN A DIGITAL LEDGER

(71) Applicant: MELLANOX TECHNOLOGIES, LTD., Yokneam (IL)

(72) Inventors: Siddha Ganju, San Jose, CA (US); Elad Mentovich, Tel Aviv (IL); Andrew Russell, Weston, FL (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 95 days.

(21) Appl. No.: 19/018,806

(22) Filed: Jan. 13, 2025

(65) Prior Publication Data

US 2025/0150270 A1 May 8, 2025

Related U.S. Application Data

(63) Continuation-in-part of application No. 17/863,779, filed on Jul. 13, 2022, now Pat. No. 12,229,296.

(51) Int. Cl.
*H04L 9/30* (2006.01)
*H04L 9/08* (2006.01)

(52) U.S. Cl.
CPC .............. *H04L 9/30* (2013.01); *H04L 9/0852* (2013.01)

(58) Field of Classification Search
CPC ................................ H04L 9/30; H04L 9/0852
See application file for complete search history.

(56) References Cited

U.S. PATENT DOCUMENTS

| | | | | |
|---|---|---|---|---|
| 11,334,882 | B1 * | 5/2022 | Jameson | H04L 9/3231 |
| 11,870,897 | B1 * | 1/2024 | Griffin | H04L 9/0869 |
| 2007/0009103 | A1 * | 1/2007 | Zhu | H04L 9/0836 380/270 |
| 2021/0176072 | A1 * | 6/2021 | Chalkias | H04L 9/0852 |
| 2022/0311597 | A1 * | 9/2022 | Goel | G06F 21/6209 |
| 2022/0383305 | A1 * | 12/2022 | Smith | G06Q 20/3827 |
| 2023/0110628 | A1 * | 4/2023 | Heckey | G06F 9/4881 |
| 2023/0112482 | A1 * | 4/2023 | Stockert | H04W 48/02 707/822 |
| 2024/0119168 | A1 * | 4/2024 | Venkatesan | H04L 63/0428 |

FOREIGN PATENT DOCUMENTS

| | | | | |
|---|---|---|---|---|
| AU | 2023366732 | A1 * | 2/2025 | H04L 9/50 |

* cited by examiner

*Primary Examiner* — Darshan I Dhruv
(74) *Attorney, Agent, or Firm* — Alston & Bird LLP

(57) ABSTRACT

Various embodiments of the present disclosure provide for generating and managing a digital ledger access system and its associated objects. An example method is configured for securing objects in a digital ledger of objects by identifying an object from amongst a plurality of objects in the digital ledger of objects and generating a quantum token for attachment with the object. The method includes deriving one or more classical public keys associated with the quantum token and determining an attempt to access the object. The method provides access to the object in response to a validation of the classical public key based on the quantum token, and the method precludes access to the object in response to an invalidation of the classical public key based on the quantum token.

20 Claims, 7 Drawing Sheets

SYSTEMS, METHODS, AND APPARATUSES FOR SECURING OWNERSHIP OF OBJECTS IN A DIGITAL LEDGER

CROSS-REFERENCE TO RELATED APPLICATIONS

This application is a Continuation-in-Part of U.S. patent application Ser. No. 17/863,779, filed on Jul. 13, 2022, titled "Systems, Methods, and Apparatuses for Securing Ownership of Objects in a Digital Ledger," which is hereby incorporated by reference in its entirety for all purposes. The content of the aforementioned application is hereby incorporated by reference in its entirety as though fully set forth herein.

TECHNOLOGICAL FIELD

Embodiments of the present disclosure relate generally to digital ledgers, and, in particular, to processes for accessing objects within a digital ledger of objects based on quantum tokens and associated verified classical public keys.

BACKGROUND

Digital ledgers, distributed ledgers, blockchains, and other database systems operate as a consensus of replicated, shared, and synchronized data in a decentralized environment. These databases are often used to secure data in that they provide a permanent (e.g., immutable, unalterable, etc.) repository for information. Through applied effort, ingenuity and innovation, various identified deficiencies and problems associated with digital ledgers have been solved by developing solutions that are configured in accordance with the embodiments of the present disclosure, many examples of which are described in detail herein.

BRIEF SUMMARY

To solve these issues and others, embodiments of the present disclosure provide systems, methods, and apparatuses for securing ownership of objects in a digital ledge by utilizing quantum tokens and associated verified classical public keys.

In one aspect, a method is presented. The method comprising: receiving, from a user, a classical public key to access an object in a digital ledger of objects, wherein the object is associated with an object-specific quantum token; validating the classical public key based on the object-specific quantum token, wherein validating further comprises determining a resolution access level for the object, wherein the resolution access level corresponds to one of a plurality of resolution access levels associated with the object; and providing access to the object at the resolution access level in response to the validation of the classical public key, wherein providing access to the object at the resolution access level comprises modifying a display resolution of the object.

In some embodiments, the method further comprises: identifying the object from amongst a plurality of objects in the digital ledger of objects; generating a quantum token for attachment with the object, wherein the quantum token is the object-specific quantum token for the object; and deriving one or more classical public keys associated with the quantum token, wherein the classical public key is one of the one or more classical public keys.

In some embodiments, the plurality of objects comprises multi-dimensional digital assets capable of being accessed, viewed, or interacted with in a virtual reality or augmented reality platform, wherein ownership of the multi-dimensional digital assets is secured using object-specific quantum tokens and associated classical public keys.

In some embodiments, each object of the plurality of objects is associated with a corresponding object-specific quantum token.

In some embodiments, in precluding access to the object, the method further comprises determining a security priority for each object; and modifying a mechanism by which access to each object is precluded based upon the corresponding determined security priority.

In some embodiments, the security priority for each object is determined based on a resource usage parameter associated with generating the corresponding object.

In some embodiments, the security priority for each of object is determined based on the user associated with the quantum token attached with the corresponding object.

In some embodiments, precluding access to the object comprises at least one of limiting the display resolution of the object, restricting user access to one or more portions of the object, collapsing a quantum state of the object-specific quantum token, generating a message interface object indicating a validity of the one or more classical public keys, or generating an input request to be provided to the user associated with the object.

In some embodiments, the method further comprises: precluding access to the object in response to an invalidation of the classical public key based on the quantum token; and transmitting an alert to an owner of the object that the object was attempted access by an invalidated classical public key.

In some embodiments, the method further comprises: detecting that the user is attempting to generate an unauthorized copy of the object; and precluding the unauthorized copying by invalidating the associated classical public key, collapsing a quantum state of the object-specific quantum token, or rendering the object inaccessible in the digital ledger.

In another aspect, an apparatus is presented. The apparatus comprising: at least one processor; and at least one memory, the at least one memory having computer-code instructions stored thereon that, when executed by the at least one processor, causes the apparatus to: receive, from a user, a classical public key to access an object in a digital ledger of objects, wherein the object is associated with an object-specific quantum token; validate the classical public key based on the object-specific quantum token, wherein validating further comprises determining a resolution access level for the object, wherein the resolution access level corresponds to one of a plurality of resolution access levels associated with the object; and provide access to the object at the resolution access level in response to the validation of the classical public key, wherein providing access to the object at the resolution access level comprises modifying a display resolution of the object.

In yet another aspect, a computer program product is presented. The computer program product comprising a non-transitory computer-readable medium comprising code configured to cause an apparatus to: receive, from a user, a classical public key to access an object in a digital ledger of objects, wherein the object is associated with an object-specific quantum token; validate the classical public key based on the object-specific quantum token, wherein validating further comprises determining a resolution access level for the object, wherein the resolution access level corresponds to one of a plurality of resolution access levels associated with the object; and provide access to the object at the resolution access level in response to the validation of the classical public key, wherein providing access to the object at the resolution access level comprises modifying a display resolution of the object.

BRIEF DESCRIPTION OF DRAWINGS

Figure 1:
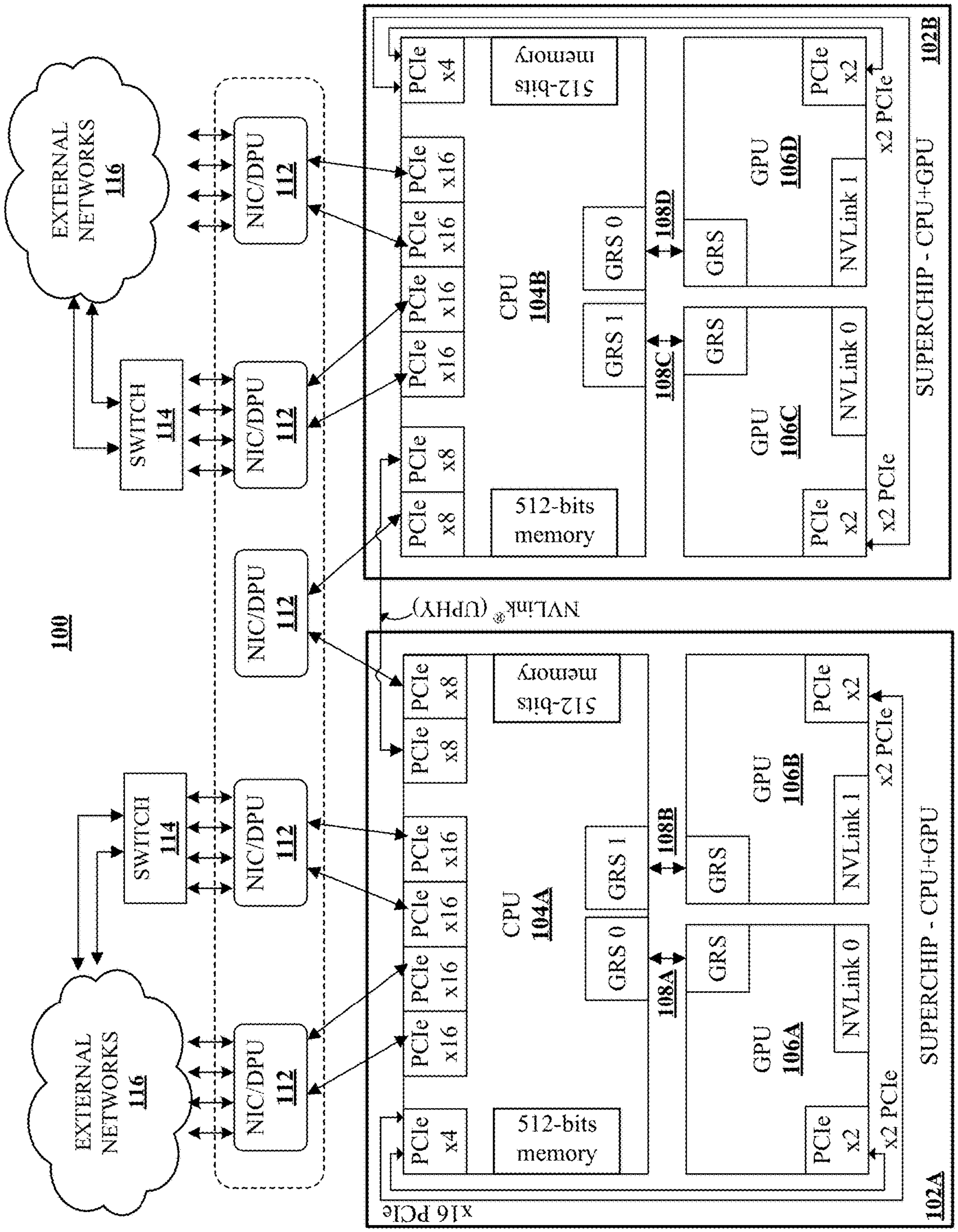
Figure 2:
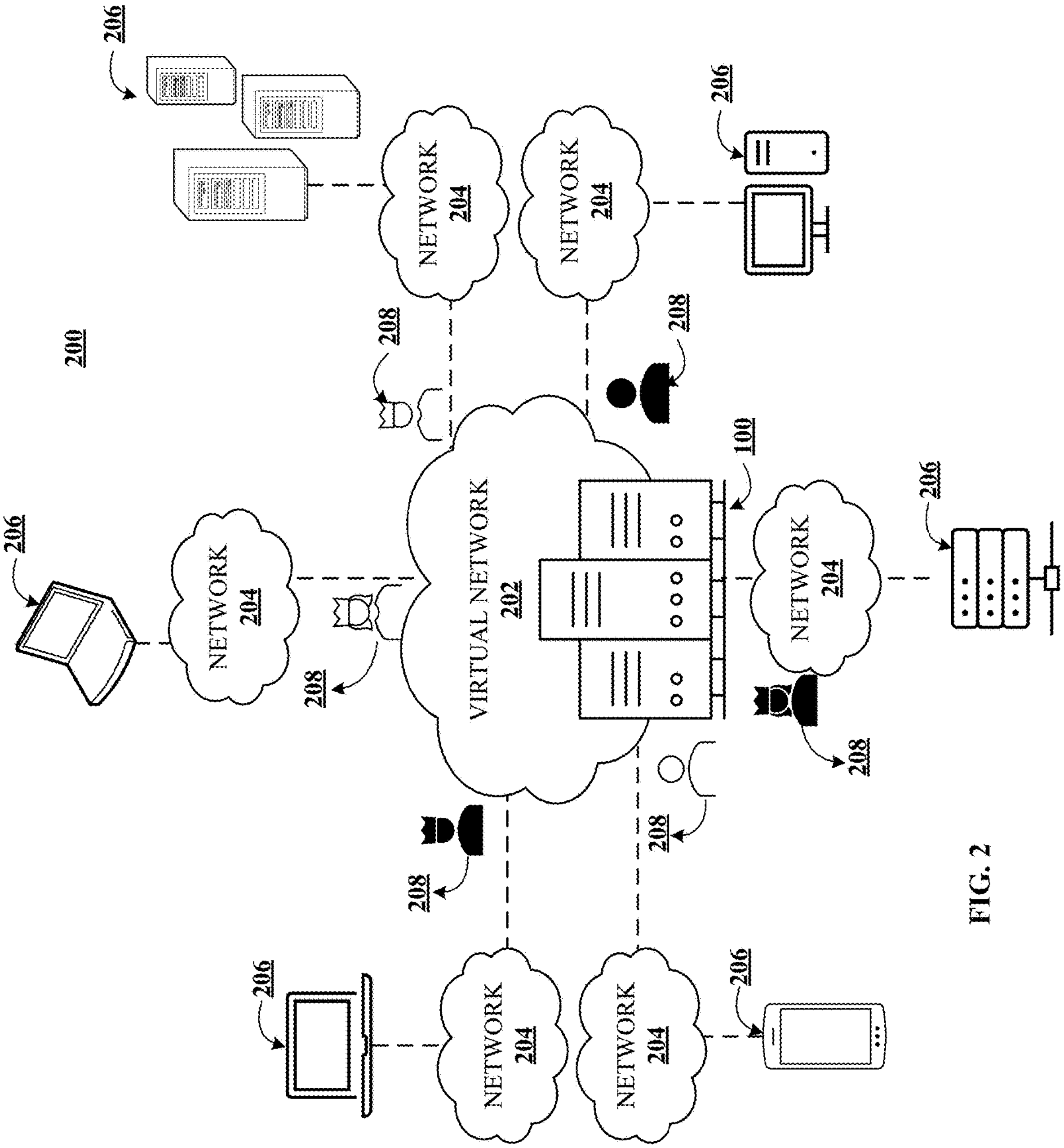
Figure 3:
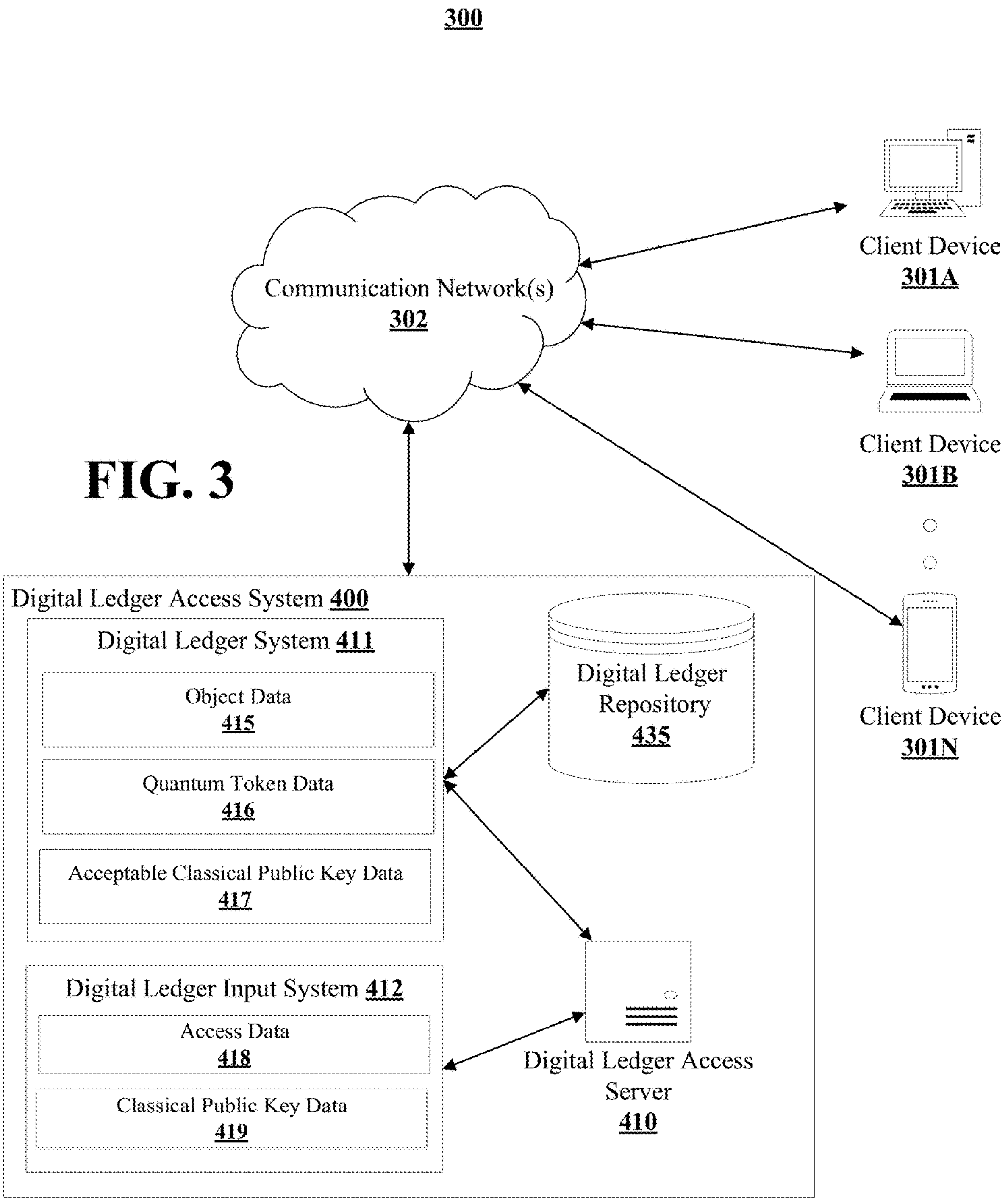
Figure 4:
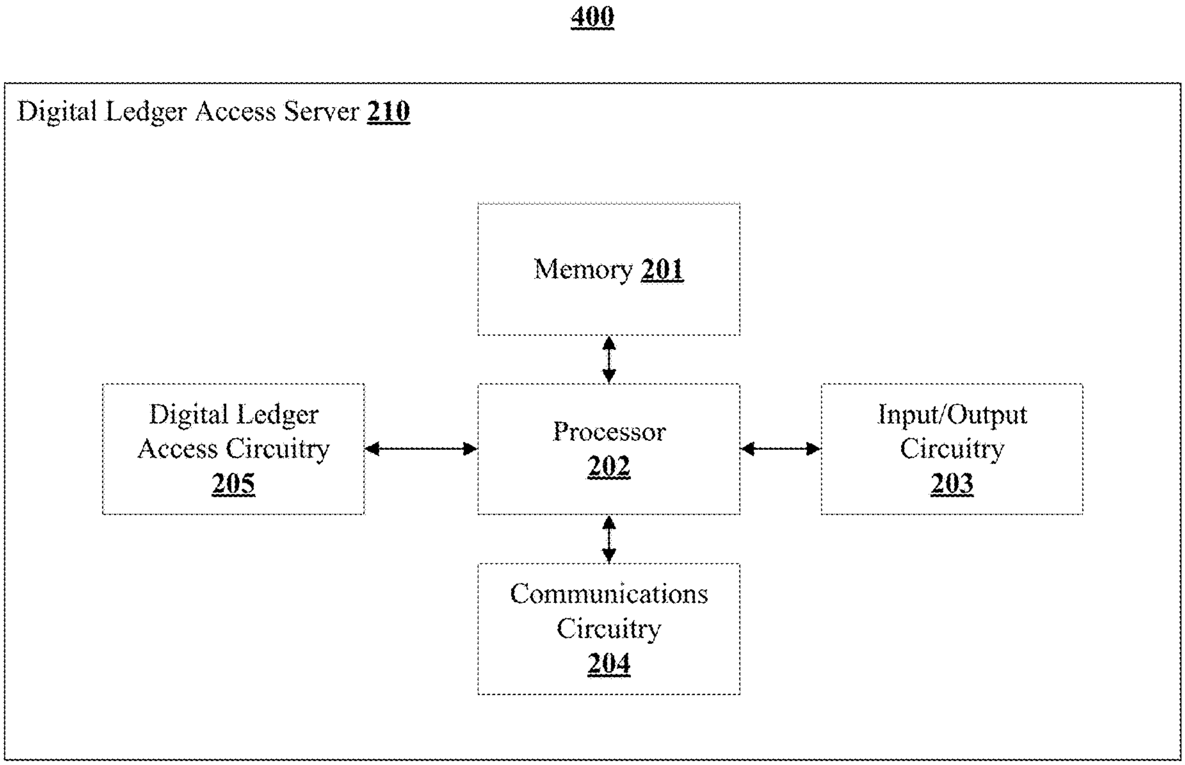
Figure 5:
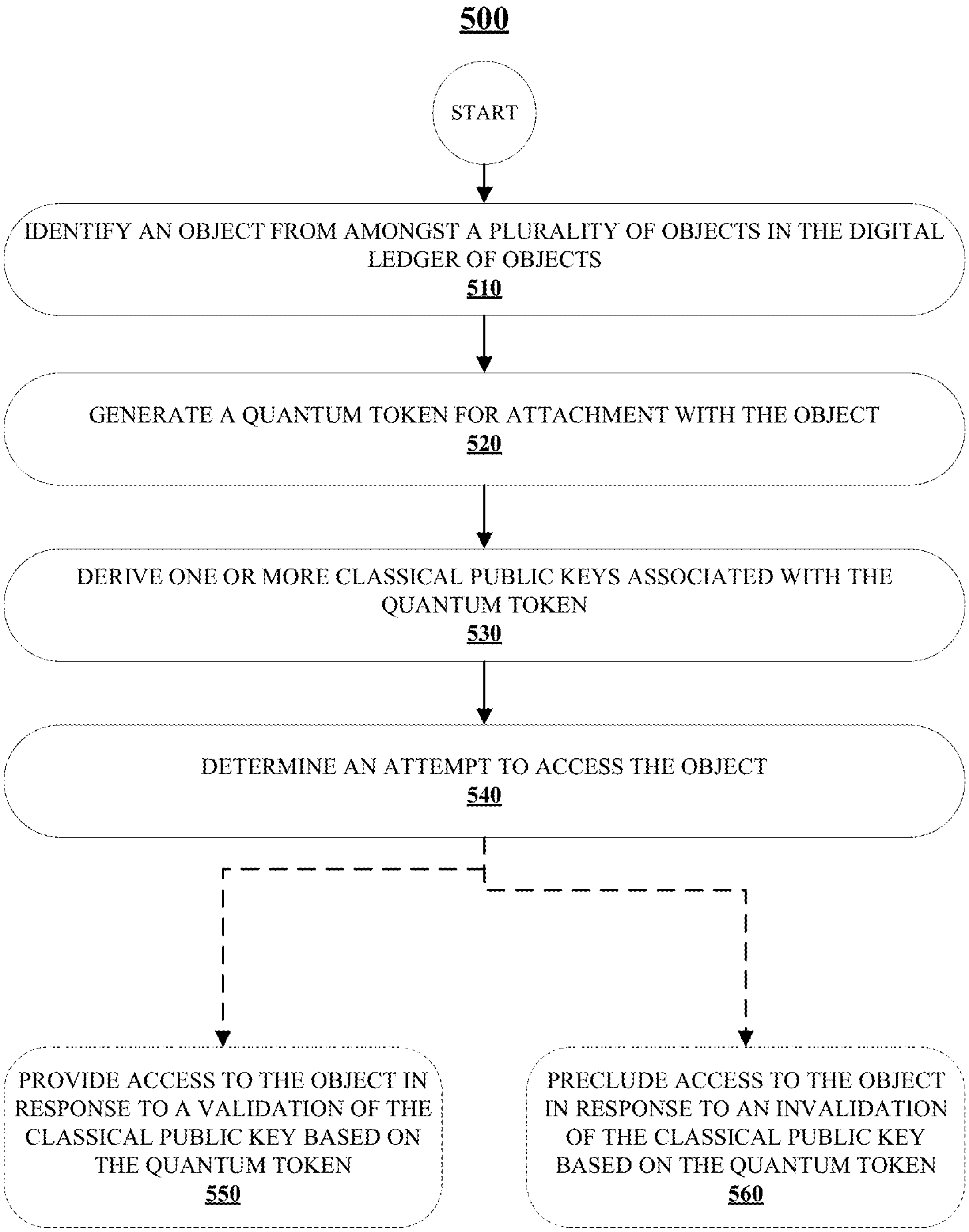
Figure 6:
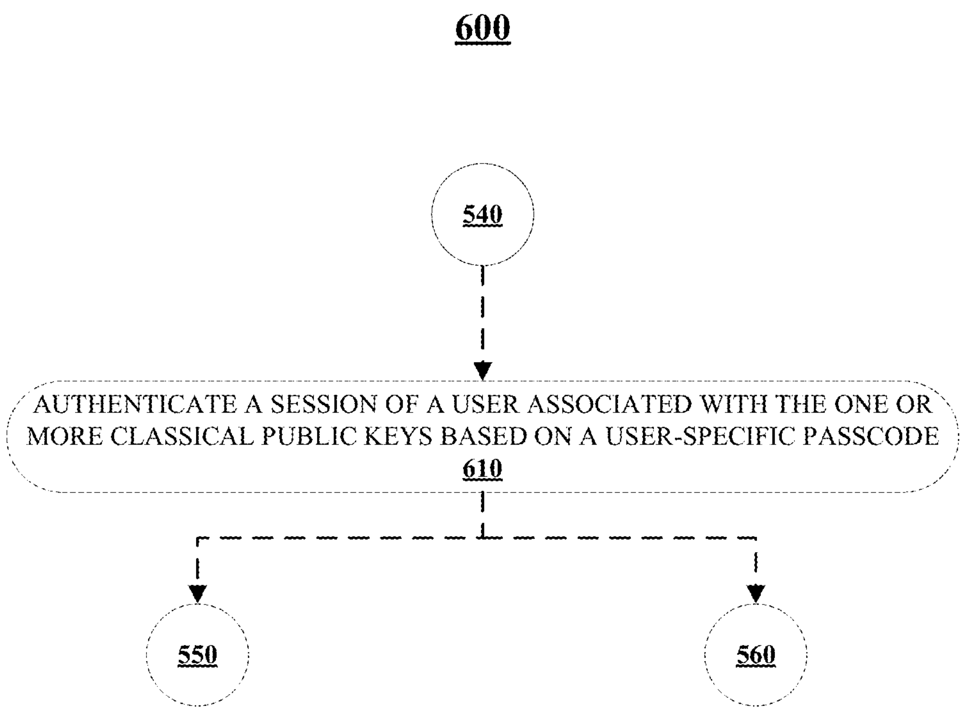
Figure 7:
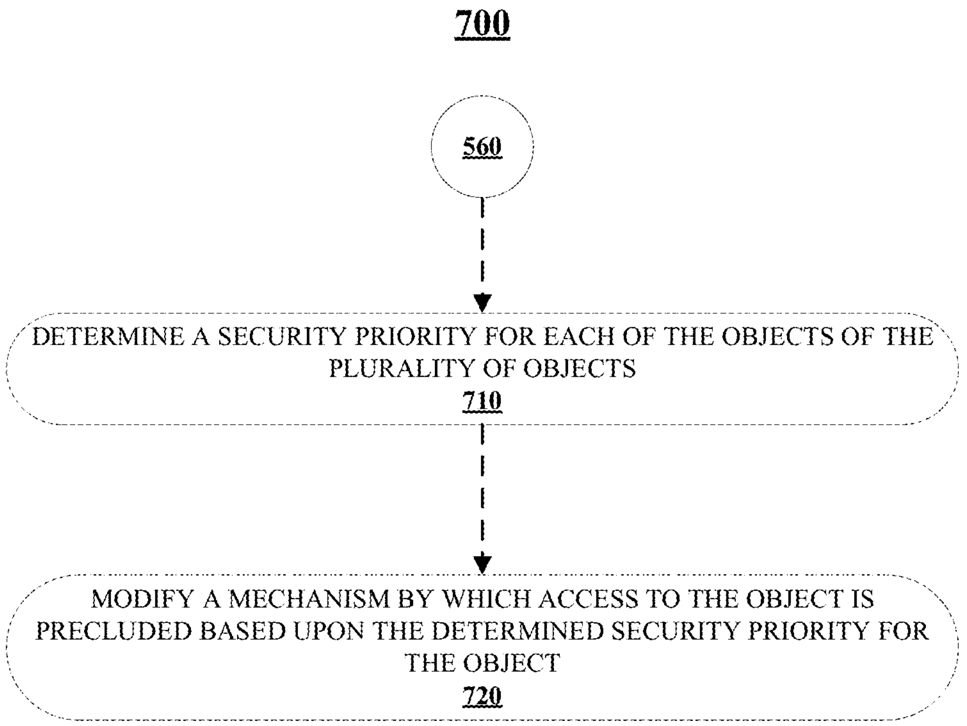

Having thus described the disclosure in general terms, reference will now be made to the accompanying drawings, which are not necessarily drawn to scale, and wherein:

FIG. 1 illustrates a schematic diagram of an example datacenter, in accordance with an embodiment of the disclosure;

FIG. 2 illustrates an example virtual environment, in accordance with an embodiment of the disclosure;

FIG. 3 is an exemplary block diagram of a digital ledger access system, along with its accompanying components, in accordance with one or more embodiments of the present disclosure;

FIG. 4 is an exemplary block diagram of a digital ledger access server, in accordance with one or more embodiments of the present disclosure;

FIG. 5 illustrates an example flowchart of a method for determining an attempt to access an object of the digital ledger and the provision or preclusion of access to the object, in accordance with one or more embodiments of the present disclosure;

FIG. 6 illustrates an example flowchart of a method for authenticating a session of a user, in accordance with one or more embodiments of the present disclosure; and FIG. 7 illustrates an example flowchart of a method for modifying a mechanism by which access to the object is precluded, in accordance with one or more embodiments of the present disclosure.

DETAILED DESCRIPTION

Definitions

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. As used herein, terms such as "front," "rear," "top," "inside," "outside," "inner," "outer," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

The term "object" refers to a digital content object that is a digital representation of an asset or resource that is tracked and managed by a digital ledger (e.g., a digital ledger of objects). Objects define discrete assets within a digital ledger as defined hereafter, such as a physical asset (e.g., computer such as a personal computer/desktop computer, furniture, vehicle, vehicle renderings, furniture renderings, presentations, real estate, etc.), a digital asset (e.g., software, digital renderings of physical assets, unique renderings of assets such as artwork, and/or the like), a set of data, or any other tangible or intangible asset (e.g., intellectual property) that may be registered, known, or accessed by the digital ledger access system. For example, an object may be a digital representation of an asset, wherein the object (and any of its accompanying data) are uploaded or otherwise stored in a digital ledger repository accessible by the digital ledger access system. In some embodiments, each object may further be associated with an "object checklist" that defines the ways in which a user may interact with a particular object, the security considerations associated with the particular object, the resolution(s) associated with the object as defined hereinafter, and/or the like.

The terms "digital ledger of objects" and/or "digital ledger" refer to a ledger, database, and/or archive of object data, which tracks object data including access information of specific objects, modifications to objects, and/or the like to form a chain or "ledger" of various objects after each access and/or change, while maintaining the previous version/versions of the objects. In some embodiments, the digital ledger of objects may be likened to what is commonly referred to in the art as a "distributed ledger" or "block chain." In some embodiments, the digital ledger may include features such as a decentralized feature (e.g., not governed by a singular entity), distributed ledgers (e.g., distribution of computational power to the users for network maintenance), and/or a timeline of objects that are linked together based on their shared object data and based on a timeline of activity for the objects within the chain. In words, the present disclosure contemplates the digital ledger of objects described herein may refer to any immutable, decentralized, unalterable, and/or transparent database system within which them embodiments described herein may be implemented.

The term "quantum token" refers to data encrypted using a quantum cryptography algorithm or post-quantum cryptography algorithm, where such a quantum cryptography algorithm or post-quantum cryptography algorithm relies on a quantum mechanism to encrypt the data. In some embodiments, the quantum token may comprise quantum states (e.g., hidden qubit states), wherein the quantum token is based on and attached to an object within a digital ledger of objects.

The terms "classical public key" or "classical public keys" refer to a numerical value used to determine the legitimacy of a user to access an object. The classical public keys described herein may be generated by a certificate authority that may issue a digital certificate to prove an object owner's and/or user's identity and contain the owner's and/or user's public key. Each generated classical public key may be paired with an object-specific quantum token. The classical public key may be generated by an asymmetric algorithm based on the object-specific quantum token.

The term "user-specific passcode" refers to one or more items of data by which a specified user of the system (e.g., digital ledger access system 200 and/or digital ledger access server 210) may be uniquely identified. For example, a user-specific passcode may comprise text and/or numbers, which may be converted into computer-readable content that may comprise ASCII text, a pointer, a memory address, and the like.

The term "resolution" may be used herein to refer to the mechanism by which access to a specific object in the digital ledger is provided. In some embodiments, the resolution may refer to a resolution access level defining the resolution at which the underlying object is viewed (e.g., measured in total activated pixels, pixels per inch (PPI), or the like). This resolution may vary based upon the access provided to a particular user (e.g., due to specific classical public keys, quantum tokens, etc. associated with the access or object). By way of a non-limiting example, the provision of access may include the ability of a user to view or see the object (e.g., at a specified resolution) while the preclusion of access may at least partially prevent the user's ability to clearly see or view the object (e.g., reduced resolution, obscured pixels, etc.). By way of another, non-limiting example, the resolution may refer to the coloring or lack thereof provided to an object (e.g., particular access levels only viewing objects in grayscale), and may further include the overlaying or addition of opaque or translucent markers, screens, or other obscuring elements that at least partially prevent viewing of the complete object.

In some embodiments, the "resolution" described herein may further refer to the ability or inability of a user to view or access particular portions of the object. By way of example, in some embodiments, the object stored by the digital ledger may be associated with an artificial intelligence (AI) model, machine learning model, neural network architecture, and/or the like. In such an example, the variable resolution provided to the user based upon access level may refer to particular portions (e.g., weighted parameters) of the example AI model as opposed to the entire AI architecture. Although described herein with reference to an AI model, the present disclosure contemplates that the embodiments described herein may selectively allow or prevent access to any portion of the object stored by the digital ledger and that access may refer to any means (e.g., listening, viewing, modifying, interacting with, etc.) by which the user interacts with the object. Furthermore, the resolution described herein may further include a time period during which access is provided to a particular user (e.g., as defined by the associated classical key, quantum token, etc.). In some embodiments, the time period associated with the access or resolution for a particular object may further be user or device specific such that, for example, a particular user device is authenticated and provided access to a particular object at a particular resolution for the time period associated with the user, access level, object, etc.

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means "including, but not limited to." The term comprising should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The terms "server" or "server device" are used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "client device" refers to computer hardware and/or software that is configured to access a service made available by a server. The server is often (but not always) on another computer system, in which case the client device accesses the service by way of a network. Client devices include, without limitation, smart phones, tablet computers, laptop computers, wearables, personal computers, enterprise computers, and the like.

Having set forth a series of definitions called-upon throughout this application, an example system architecture is described below for implementing example embodiments and features of the present disclosure.

Example Datacenter Network Environment

FIG. 1 illustrates a schematic diagram of an example datacenter 100, in accordance with an embodiment of the disclosure. The datacenter 100 may include high-performance computing (HPC) clusters 202, 102B, network interface controller/data processing units (NIC/DPUs) 108, switches 114, external networks 116, and system 110. The HPC clusters 202, 102B may house computing resources. The NIC/DPUs 112 may act as intermediate processing and management units that facilitate data transmission between HPC clusters 202, 102B and datacenter switches 114. The datacenter switches 114 may manage and route data between the HPC clusters 202, 102B and the external networks 116. The external networks 116 may connect the datacenter 100 to external devices, services, or other datacenters, enabling communication beyond the datacenter. The system 110 may serve as a centralized management and control system within datacenter 100, overseeing resource allocation, link management, and network optimization, according to various embodiments described herein.

HPC clusters (e.g., HPC clusters 202, 102B) may house various computing resources designed to support computationally demanding tasks. These HPC clusters may include central processing units (CPUs), such as NVIDIA Grace™ CPUs, and graphics processing units (GPUs), such as NVIDIA® H100 Tensor Core GPUs, memory modules, and interconnects to facilitate data exchange and processing. In example embodiments, each HPC cluster may be configured to handle specific types of workloads, such as general-purpose computing, data processing, specialized tasks like artificial intelligence (AI) and machine learning (ML) applications, and/or the like. For example, NVIDIA® Tensor Core GPUs may be used to accelerate AI and ML workloads by performing parallel processing of large datasets. The configuration of the HPC clusters may be scalable, allowing for additional compute nodes, such as those with GPUs and CPUs, to be added or removed as needed based on computing requirements.

In specific embodiments, the CPU and/or the GPUs, or portions or components thereof, may be embodied as or include a chip or chipset. In other words, the CPU and/or the GPUs may include physical packages (e.g., chips) including materials, components, and/or wires on a structural assembly (e.g., a baseboard). The structural assembly may provide physical strength, conservation of size, and/or limitation of electrical interaction for component circuitry included thereon. The CPU and/or the GPUs, may therefore, in some cases, be configured to implement an embodiment of the disclosure on a single chip or as a single "system on a chip (SoC)." As such, in some cases, a chip or chipset may constitute means for performing one or more operations for providing the functionalities described herein. In this configuration, the CPU may be coupled to a GPU via die-to-die (D2D) interconnects, chip-to-chip (C2C) interconnects, such as a Ground-Referenced Signaling (GRS) interconnect, and/or the like, allowing for low-latency communication and high bandwidth between the CPU and GPU. Additionally, the CPU can connect to multiple GPUs using both D2D/C2C interconnects and high-speed interconnects, such as PCIe interconnects, such as PCIe Gen 5×16 lanes. Within each HPC cluster, the GPUs may also be operatively coupled to one another to facilitate direct GPU-to-GPU communication using high-speed interconnect technologies such as NVLink® or other interconnects specifically designed for direct GPU communication. NVLink® may provide a high-bandwidth, low-latency communication channel between GPUs, supporting data synchronization and sharing for tasks that require significant inter-GPU communication, such as matrix computations, simulations, or AI model training.

In the embodiment shown in FIG. 1, CPU 104A is operatively coupled to GPUs 106A and 106B via GRS-compatible interconnects, 108A and 108B, and CPU 104B is operatively coupled to GPUs 104C and 106D via GRS-compatible interconnects, 108C and 108D. Each CPU may include GRS-compatible ports, such as GRS 0 and GRS 1, which are configured to interface with corresponding GRS ports on the GPUs. For example, CPU 104A may utilize its GRS 0 port to connect to GPU 106A and its GRS 1 port to connect to GPU 106B, while CPU 104B may use its GRS 0 and GRS 1 ports to connect to GPUs 104C and 106D, respectively. The GRS-compatible interconnects may provide pathways for data exchange, workload distribution, and processing synchronization between the CPUs and GPUs, supporting high-bandwidth, low-latency communication. Alternatively or additionally, the CPUs 104A and 104B may be operatively coupled to GPUs 106A, 1046, 106C, and 106D via PCIe interconnects. These PCIe interconnects may utilize multi-lane configurations, such as PCIe Gen 4 or Gen 5×16 lanes, to provide high-bandwidth, scalable data transfer channels between the CPUs and GPUs. In this configuration, the PCIe interconnects may support dynamic link width adjustments, allowing the bandwidth to scale based on workload intensity, thereby optimizing resource allocation within the system.

GPUs 106A and 106B within HPC cluster 202 and GPUs 104C and 106D within HPC cluster 102B may be interconnected via NVLink® interconnects via NVLink® compatible ports, NVLink 0 and NVLink 1 respectively, allowing coordinated parallel processing across GPUs for computationally demanding workloads. HPC clusters 202 and 102B may be interconnected through high-bandwidth interconnect, such as an NVLink® or Unified Physical Layer (UPHY) interconnect, allowing for data transfer and synchronization between the server systems. The high-bandwidth interconnect may support parallel processing and may improve the overall computational throughput of the HPC cluster, making it suitable for applications like artificial intelligence (AI), machine learning (ML), and data-intensive simulations. Each CPU (e.g., 104A) within a HPC cluster (e.g., 202) may be equipped with memory modules, such as a 512-bit memory module, to provide data access for both CPUs and GPUs. The memory modules may be directly connected to the respective CPUs, reducing latency and supporting high-speed operations.

As shown in FIG. 1, the HPC clusters 202 and 102B may be operatively coupled to NIC/DPUs 112, enabling efficient offloading of data processing and security tasks, further reducing the computational burden on the server CPUs and improving overall data flow within the rack. Each NIC/DPU 112 may integrate NIC and DPU functionalities to enhance the efficiency of data center operations. The NIC/DPU 112 may be configured to offload various network, storage, and security tasks from the HPC clusters (e.g., HPC cluster 202, 102B), in particular, CPUs in the HPC clusters, allowing the CPUs to focus on compute-intensive workloads. The NIC/

DPU 112 may facilitate high-speed data transmission, optimize data flow, and enable advanced network services with minimal impact on server performance. The NIC component within the NIC/DPU 112 may handle standard network functions, such as packet transmission and reception, supporting high-speed Ethernet or InfiniBand® protocols. By facilitating fast data transfers between the HPC clusters 202 and 102B and external networks 116, the NIC enables efficient communication across the datacenter environment. The NIC may also support offloading network protocol processing, reducing the overhead on HPC clusters 202 and 102B, in particular, CPUs in the HPC clusters 202 and 102B, and improving overall data throughput. The DPU component of the NIC/DPU 112 may extend these capabilities by offloading more advanced processing tasks, such as data encryption and decryption, packet inspection and filtering, virtualization support, and/or the like. In example embodiments, DPU may be NVIDIA BlueField®-2 DPUs, which provide a high-performance platform for data center acceleration. The BlueField-2 architecture may include up to 8 Arm cores, enabling the NIC/DPU 112 to execute network, storage, and security tasks independently of the HPC clusters, in particular, CPUs in the HPC clusters. By performing these tasks closer to the data source, the NIC/DPU 112 may reduce data movement across the network, lower latency, and enhance overall system efficiency.

The NIC/DPU 112 may also include a dedicated memory subsystem, such as dynamic random-access memory (DRAM), to support local processing and ensure high-speed data access. Additionally, the NIC/DPU 112 may be configured to manage NVMe over Fabrics (NVMe-oF) storage protocols, allowing for efficient remote storage access and fast data retrieval. The combined NIC and DPU functionalities within the NIC/DPU 112 may support various advanced networking features, including traffic shaping and load balancing, remote direct memory access (RDMA), virtual machine and container isolation, and/or the like.

Switches 114 may manage the data flow between the HPC clusters 202, 102B and the external networks 116. The switches 114 may be responsible for routing and distributing data between servers within the datacenter and facilitating communication with external networks. Switches 114 may be configured to support various high-speed network protocols, such as Ethernet or InfiniBand® protocols, depending on the performance and bandwidth requirements of the datacenter. The switches 114 may include optical switches, which use light signals for data transmission, offering high bandwidth and low latency for long-distance communication. Alternatively, the switches 114 may include electrical switches, which rely on electronic signals and may be used for shorter distances or when lower latency is a priority. In some configurations, hybrid switches may be used, combining both optical and electrical components to balance performance and flexibility. The switches 114 may be advanced networking switches, such as Nvidia Quantum-2 switches, configured to provide high throughput capabilities. The switches 114 may operate at different layers of the network stack, including Layer 2 (data link layer) and Layer 3 (network layer), to perform switching and routing functions. Multiple switches 114 may be interconnected to provide redundancy and load balancing for reliable data transfer even if one switch fails. The switches 114 may support scalable configurations, allowing the network environment to expand as additional HPC clusters 202, 102B or external networks 116 are introduced.

In certain embodiments, the number and arrangement of switches 114 within the datacenter 100 may be based on the overall network topology deployed in the datacenter environment. The choice of network topology may influence the scalability, performance, fault tolerance, and bandwidth distribution of the network, thus affecting how many switches are required and how they are interconnected. Examples of network topology may include fat-tree topology, SlimFly topology, dragonfly topology, HyperX topology, torus topology, Clos (folded-Clos) topology, mesh topology and/or the like. For instance, in a fat-tree topology, the network is structured as a multi-tiered hierarchy with equal-cost paths between any two endpoints. The fat-tree topology may be built using three layers of switches: leaf switches at the bottom layer, directly connected to the HPC clusters 202, 102B, spine switches in the middle layer, which interconnect the leaf switches, and core switches at the top, which interconnect multiple sets of spine switches. In a SlimFly topology, the switches 114 may be arranged to minimize the average path length between servers, reducing communication latency. The total number of switches 114 may be fewer than in fat-tree topology, but their arrangement may be more complex to optimize the number of direct and indirect connections between nodes. Dragonfly topology may organize switches into groups (or "pods"), with high-bandwidth connections within each group and lower-bandwidth connections between groups. The switches 114 may be arranged into several pods, with each pod containing a set of leaf switches connected to HPC clusters 202, 102B and local spine switches. In addition, there may be fewer inter-pod connections than intra-pod connections. In hyperX topology, switches may be arranged in a multi-dimensional grid, with each switch connected to multiple neighboring switches in different dimensions. The total number of switches may scale with the number of dimensions and network size. In a torus topology, the switches 114 may be connected in a loop or ring structure. Torus topology may offer reduced wiring complexity and built-in redundancy, as each switch is connected to multiple adjacent switches. In larger datacenters, a higher-dimensional torus (e.g., 3D or 4D torus) may be implemented, where switches are arranged in a multi-layered grid. In a Clos topology, also known as a folded-Clos or CLOS architecture, the switches 114 may be arranged in multiple layers of switching stages, with each stage containing multiple switches. In this configuration, each server system 102 may connect to a set of leaf switches, which in turn connect to multiple spine switches. Additional spine and leaf switches may be added as the network grows, with the number of switches 114 increasing in proportion to the number of server systems and external networks connected.

The external networks 116 represent a range of connectivity options that facilitate communication between the datacenter and various external systems, such as other datacenters, cloud service providers, and/or the like. These external networks 116 may include local area networks (LANs), which connect devices within a limited geographical area, as well as WANs that span larger distances and connect multiple LANs. Additionally, external networks 116 may include cloud networks, which provide scalable resources and services hosted remotely, and private networks, which offer secure communication channels for sensitive data transfer. Other types of external networks may include virtual private networks (VPNs) that enable secure access over the internet and Content Delivery Networks (CDNs) that optimize the delivery of content to end-users. Each of these external networks may utilize various communication protocols, such as Ethernet, InfiniBand®, or MPLS (Multiprotocol Label Switching) protocols, to ensure reliable and efficient data transfer.

It should be noted that the description provided herein is merely one embodiment of the datacenter 100 and the associated components, including the switches 114 and the NIC/DPU 112. Various modifications, alterations, and adaptations may be made without departing from the scope of the disclosure. The specific configurations, components, and functionalities described are illustrative and may be replaced or modified in other embodiments depending on the particular requirements of the datacenter environment. For example, different network topologies, alternative processing units, or variations in server configurations may be used to achieve similar objectives. As such, the scope of the disclosure should not be limited by the described embodiment.

Example Virtual Environment

FIG. 2 illustrates an example virtual environment 200, in accordance with an embodiment of the disclosure. The virtual network 202 may refer to a digital environment in which multiple entities, represented by corresponding avatars 208, can interact with one another in a secure and controlled manner. Each entity's end-point device 206 may connect to the virtual network 202 via networks 104, and the avatar 208 corresponding to each end-point device may operate within the virtual environment. The virtual network 202 may comprise a variety of components and services, tailored to support secure, real-time interactions between avatars 208. In this regard, the virtual network 202 may support various applications, including financial transactions, healthcare data exchanges, educational collaborations, and/or other sensitive communications. The virtual network 202 may operate as a software-defined environment, meaning it may be dynamically controlled and managed by software, allowing for greater flexibility and scalability. Such a configuration may allow the virtual network 202 to allocate resources on-demand, optimize network traffic, and implement encryption algorithms in real time based on the needs of the interacting entities. In some embodiments, the virtual network 202 may support isolated virtual segments or sub-networks, ensuring that certain groups of entities interact within their own secure channels, further enhancing privacy and security. Additionally, the virtual network 202 may be configured to handle large-scale, simultaneous interactions, allowing many entities to participate in the virtual environment concurrently without degradation of performance or security. Such scalability may be supported by the underlying hardware resources provided by the datacenter 100, which can dynamically allocate processing power, memory, and network bandwidth to meet the demands of the virtual network 202. As such, the datacenter 100 may provide the necessary computational resources to support the activities within the virtual network 202, including encryption and decryption operations, data validation, and secure communications.

The network 204 may operatively couple the datacenter 100 to the end-point devices 206 for data exchange and secure connectivity within the virtual network 202. Each end-point device 206 may be connected to the virtual network 202 through its respective network 204, which may include a range of network types depending on the device and operational requirements. Examples of network 204 may include both wired and wireless communication networks, depending on the specific operational needs of the entities interacting within the virtual network 202.

Wired communication networks may include an Internet Protocol (IP) network, an Ethernet network, a Fibre Channel network, or combinations thereof (e.g., Fibre Channel over Ethernet). These networks may provide high-speed connections that are well-suited for applications requiring reliable, consistent data transfer. For instance, an IP or Ethernet network may offer widespread compatibility and ease of integration, supporting various protocols and applications used by the datacenter 100 and the end-point devices 206. For high-performance applications within the virtual network 202, such as those involving sensitive data or real-time transactions, a Fibre Channel network may be implemented for its reliability and speed in accessing storage resources. This makes Fibre Channel networks particularly beneficial for managing large volumes of data, such as in secure financial transactions or handling sensitive healthcare records. In cases where higher throughput and lower latency are part of the requirement, an IB network may be employed to facilitate rapid data transfers, making it ideal for HPC environments.

In contrast, wireless communication networks may be used to provide more flexible and mobile connectivity for end-point devices 206 that are not physically tethered to the network. These networks can include Wi-Fi, Bluetooth, cellular networks (e.g., 4G, 5G), or satellite-based networks. Wireless networks extend the reach of the virtual network 202 by enabling remote or mobile end-point devices 206 to securely access the virtual network 202 and the datacenter 100 from virtually any location. Wireless communication may be especially useful for portable devices such as smartphones, tablets, and laptops, allowing users to interact seamlessly within the virtual environment, represented by their corresponding avatars 208.

The end-point devices 206 may represent the diverse array of computing devices through which users or entities interact with the virtual network 202, hosted within the datacenter 100. The end-point devices 206 may facilitate user access to the virtual environment and serve as the operational endpoints for transmitting and receiving data securely over the networks 204. The end-point devices 206 can range from personal computing devices to more complex server systems, depending on the user's requirements and the nature of the tasks performed within the virtual network 202. For instance, the end-point devices 206 may include personal computers and laptops, specialized workstations and servers, Internet of Things (IoT) devices, and/or the like. In particular, personal computers and laptops may be used by individual users to access the virtual environment for tasks such as communication, collaboration, and resource access. Specialized workstations or servers, on the other hand, may be deployed by entities to perform more resource-intensive tasks, such as data analysis, simulations, or secure data management within the virtual network 202. In some cases, IoT devices may be connected to the virtual network 202 to gather and transmit data for real-time processing and analysis. These devices may include sensors, smart devices, and other connected systems that provide valuable data to the virtual environment.

It should be understood that virtual environment 200 may include additional components and functionalities within the scope of the present disclosure. The specific examples and embodiments described herein are not intended to limit the disclosure, but rather to illustrate potential configurations and implementations. Modifications, enhancements, or substitutions of elements may be made without departing from the spirit and scope of the disclosure.

Example Hosting of Virtual Environment on the Datacenter

The virtual environment may be hosted on the datacenter 100, which provides the necessary computational, storage, and networking resources to support its operation. As described in FIG. 1, the datacenter 100 may include HPC clusters 102A, 102B, NIC/DPUs 112, switches 114, and external networks 116. These components may be configured to host and operate the virtual environment, supporting immersive user interactions and multi-dimensional digital assets.

In some embodiments, the HPC clusters 102A, 102B may provide the computational backbone for the virtual environment, supporting rendering, simulation, and real-time processing tasks. The CPUs and GPUs within the clusters may handle complex workloads such as 3D modeling, virtual reality rendering, and augmented reality simulations. For example, GPUs within the HPC clusters may perform parallel processing of large datasets to ensure smooth interactions and visual fidelity within the virtual environment.

The NIC/DPUs 112 may facilitate data transmission and task offloading within the datacenter 100. These components may handle encryption, decryption, and packet inspection to ensure secure communication between the virtual environment and external devices. Additionally, the NIC/DPUs 112 may offload virtualization and storage-related tasks, optimizing resource usage and allowing the HPC clusters to focus on rendering and interaction processing.

The switches 114 may manage data flow between the components of the datacenter 100 and external networks 116. These switches may support high-speed communication protocols such as InfiniBand® or Ethernet, ensuring efficient and reliable connectivity for the virtual environment. Redundancy and load balancing mechanisms provided by the switches 114 may enhance the availability and fault tolerance of the virtual environment.

Storage systems within the datacenter 100 may be used to manage the data associated with the virtual environment, including 3D models, textures, and interaction logs. These storage systems may include distributed storage clusters or NVMe-over-Fabric (NVMe-oF) subsystems, providing scalable and high-speed access to data. Redundancy and fault tolerance mechanisms may further ensure the security and availability of stored data.

The external networks 116 (e.g., networks 204) may connect the datacenter-hosted virtual environment to end-point devices (e.g., end-point devices 206), enabling seamless interaction. These networks may include public and private options, such as virtual private networks (VPNs) or cloud-based services, ensuring secure and reliable communication with VR and AR platforms used by users.

By hosting the virtual environment on the datacenter 100, the architecture may deliver high-performance, scalable, and secure operations for immersive platforms.

Example System Architecture

Methods, apparatuses, systems, and computer-program products of the present disclosure may be embodied by any of a variety of computing devices. For example, the method, apparatus, system, and computer-program product of an example embodiment may be embodied by a networked device, such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

With reference to FIG. 3, an example computing system 300 within which some embodiments of the present disclosure operate is illustrated. In particular, FIG. 3 illustrates a digital ledger access system 400 configured to communicate with one or client devices 301A-301N in accordance with some example embodiments described herein. Users may access a digital ledger access system 400 via a communications network 302 using one or more of client devices 301A-301N, and the digital ledger access system 400 may comprise a digital ledger system 411, digital ledger access server 410 in communication with at least one repository (e.g., such as the digital ledger repository 435), and/or a digital ledger input system 412 that is likewise in communication with the digital ledger access server 410. The digital ledger repository 435, and likewise other repositories, may be hosted by digital ledger access server 410 (of FIG. 4), datacenter 100, or otherwise hosted by devices in communication with the digital ledger access server 410. The digital ledger access system 400 is, in some embodiments, able to generate a digital ledger access interface which may comprise a message interface object (e.g., which may alert an owner of an object that access was granted or denied for an attempt to access an object) and/or object data, wherein the digital ledger access interface is in association with the digital ledger access system 400, as will be described below.

Digital ledger access server 410 may include circuitry, networked processors, or the like configured to perform some or all of the digital ledger access server-based processes described herein (e.g., accessing object data, generating and accessing quantum token data, generating and accessing acceptable classical public key data, accessing access data provided by a user, and/or accessing classical public key data associated with the user of the access data, and/or the like), and may be any suitable network server and/or other type of processing device. In this regard, the digital ledger access server 410 may be embodied by any of a variety of devices, for example, the digital ledger access server 410 may be embodied as a computer or a plurality of computers. For example, the digital ledger access server 410 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 4 and described in connection therewith. In some embodiments, the digital ledger access server 410 may be located remotely from the digital ledger repository 435, although in other embodiments, the digital ledger access server 410 may comprise the digital ledger repository 435. The digital ledger access server 410 may, in some embodiments, comprise several servers or computing devices performing interconnected and/or distributed functions. Despite the many arrangements contemplated herein, the digital ledger access server 410 is shown and described herein as a single computing device to avoid unnecessarily overcomplicating the disclosure.

The digital ledger access server 410 may communicate with one or more client devices 301A-301N via communications network 302. In an example embodiment, the communication network(s) 302 may be network 204 or external networks 116, depending on the specific configuration of the system environment. Communications network 302 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 302 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 302 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the digital ledger access system 400.

The digital ledger repository 435 may be stored by any suitable storage device configured to store some or all of the information described herein (e.g., memory 201 of digital ledger access server 410 or a separate memory system separate from the digital ledger server 410, such as one or more database systems, backend data servers, network databases, cloud storage devices, or the like provided by another device (e.g., online application or 3rd party provider), such as a Network Attached Storage (NAS) device or devices, or as a separate database server or servers). Digital ledger repository 435 may comprise data received from the digital ledger access server 410 (e.g., via a memory 201 and/or processor(s) 202) and/or a client device 301A-301N, and the corresponding storage device may thus store this data. Digital ledger repository 435 may include information accessed and stored by the digital ledger access server 410 to facilitate the operations of digital ledger access system 400. As such, the digital ledger repository 435 may include, for example, without limitation, digital ledger access data such as object data 415, quantum token data 416 (e.g., which may be associated with object-specific quantum tokens), acceptable classical public key data 417 (e.g., which may be associated with the acceptable classical public key associated with an object-specific quantum token for specific object(s)), access data 418 (e.g., which may comprise user authentication data), classical public key data 419 (e.g., which may be associated with the classical public key provided by the user attempting to access an object), and/or the like.

The client devices 301A-301N may be implemented as any computing device or end-point device (e.g., end-point device 206) as defined above. That is, the client devices 301A-301N may also include circuitry, networked processors, or the like configured to perform some or all of the apparatus-based processes described herein and may include a suitable network server and/or other type of processing device (e.g., a controller or computing device of the client devices 101-301N). Electronic data received by the digital ledger access server 410 from the client devices 301A-301N may be provided in various forms and via various methods. For example, the client devices 301A-301N may include desktop computers, laptop computers, smartphones, netbooks, tablet computers, wearables, and/or other networked device, that may be used for any suitable purpose in addition to presenting the digital ledger access interface to a user and otherwise providing access to the digital ledger access system 400. The depictions in FIG. 3 of "N" client devices are merely for illustration purposes. According to some embodiments, the client devices 301A-301N may be configured to display an interface on a display of the client device for viewing, editing, and/or otherwise interacting with at least one digital ledger access interface, which may be provided by the digital ledger access system 400.

In embodiments where a client device 301A-301N is a mobile device, such as a smartphone or tablet, the client device 301A-301N may execute an "app" to interact with the digital ledger access system 400. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 301A-301N may interact with the digital ledger access system 400 via a web browser. As yet another example, the client devices 301A-301N may include various hardware or firmware designed to interface with the digital ledger access system 400. Example embodiments contemplated herein may have various form factors and designs but will nevertheless include at least the components illustrated in FIG. 4 and described in connection therewith.

In specific embodiments, the digital ledger access system 400, may be used to manage virtual assets within the virtual environment hosted on the datacenter 100. These virtual assets may include multi-dimensional digital objects such as 3D models, virtual spaces, or augmented reality elements. The system may ensure secure ownership, access control, and traceability of these assets by leveraging object-specific quantum tokens and associated classical public keys. In some embodiments, each virtual asset may be registered as an object in the digital ledger repository 235. During this process, the digital ledger access system 400 may generate an object-specific quantum token for the asset and associate it with one or more classical public keys, which may be distributed to the owners or authorized users of the asset. This association may ensure that access to or interactions with the asset are restricted to users with validated keys. For example, an augmented reality object, such as a digital representation of a work of art, may be assigned a unique quantum token and stored in the ledger with metadata detailing its ownership, provenance, and usage rights.

The digital ledger access system 400 may manage interactions with these virtual assets by validating access requests. For instance, when a user attempts to view, modify, or transfer a virtual asset in the virtual environment, the digital ledger access server 410 may verify the user's credentials, including their classical public key, against the quantum token associated with the asset. If the validation is successful, the system may grant the requested access or interaction. Otherwise, access may be precluded, or the interaction may be limited, such as by reducing the resolution or level of detail of the displayed asset.

In addition to managing access, the digital ledger access system 400 may facilitate the transfer of ownership of virtual assets. For example, if a user in the virtual environment wishes to sell or trade a digital object, the system may update the ledger to reflect the new ownership by generating a new quantum token and associating it with the classical public key of the new owner. Furthermore, the digital ledger access system 400 may track and log all interactions with virtual assets, creating an immutable history for each object. This history may include details such as the date and time of access, the user's credentials, and the specific interactions performed (e.g., viewing, modifying, or transferring the asset). By maintaining this record, the system may support use cases such as resolving disputes over ownership, verifying provenance, or auditing compliance with usage policies.

The integration of the digital ledger access system 400 with the virtual environment hosted on the datacenter 100 may enable interactions such as accessing, viewing, modifying, transferring, or otherwise engaging with multi-dimensional digital objects in the virtual or augmented reality platform. The digital ledger access system 400 may facilitate these interactions by providing secure validation of ownership and access rights. For instance, when a user interacts with a virtual asset, such as selecting or attempting to access a 3D object within the virtual environment, the digital ledger access system 400 may process the request by validating the user's credentials and associated classical public key against the quantum token linked to the asset. This validation ensures that only authorized users are granted access or allowed to interact with the asset. For example, a user may attempt to display a high-resolution virtual sculpture. The system, after successful validation of the user's public key, may render the sculpture in full resolution for viewing. Conversely, if validation fails, the system may preclude access or provide only limited interaction, such as a low-resolution rendering of the object.

In some embodiments, the virtual environment may utilize the digital ledger to dynamically manage asset access based on real-time user interactions. For instance, if a user modifies a virtual object, such as resizing a digital model or adding annotations, the digital ledger access system 400 may log the modification as a new version of the object, updating the ledger with the latest changes while preserving the history of previous iterations. This version control ensures that all modifications are traceable and reversible if necessary.

Ownership transfers of virtual assets may also be mediated by the digital ledger access system 400. For example, a user in the virtual environment may choose to sell a digital property, such as a virtual plot of land or a collectible 3D object. Upon initiating the transfer, the system may generate a new quantum token for the asset and associate it with the buyer's classical public key, completing the transaction. The updated ownership record may then be reflected in the ledger, ensuring transparency and security in the transfer process.

Example Hosting of Digital Ledger Access System on the Datacenter

The digital ledger access system 300, as described in FIG. 3, may be hosted on the datacenter 100, leveraging its computational, networking, and storage resources to support secure and efficient operations. The HPC clusters 102A, 102B, NIC/DPUs 112, switches 114, and/or external networks 116 of the datacenter 100, may collectively provide the necessary infrastructure for hosting the digital ledger access system 300.

The HPC clusters 102A, 102B within the datacenter 100 may serve as the primary computational platform for the digital ledger access system 300. These HPC clusters 102A, 102B may host the digital ledger access server 310, which is responsible for managing core operations such as generating object-specific quantum tokens, validating classical public keys, and processing access requests for objects in the digital ledger. The CPUs and GPUs within the HPC clusters may perform cryptographic calculations, data processing, and other tasks essential to the system's functionality. For example, GPUs may accelerate operations involving quantum token generation and secure data encryption.

In some embodiments, the digital ledger repository 335, which stores data such as quantum tokens, classical public keys, and object data, may be distributed across the storage infrastructure of the datacenter 100. This storage infrastructure may include network-attached storage systems or NVMe-over-Fabric (NVMe-oF) storage subsystems managed by the NIC/DPUs 112. The distributed nature of this storage may provide scalability and redundancy, ensuring the repository remains accessible and secure even during high-demand periods or potential system failures.

The NIC/DPUs 112 may facilitate efficient communication and task offloading within the datacenter 100, optimizing the performance of the digital ledger access system 300. For instance, the NIC/DPUs may handle encryption and decryption processes for secure data transfers between the digital ledger access server 310 and the repository 335. These components may also offload certain network-related tasks, reducing the processing burden on the HPC clusters and ensuring faster response times for access requests.

The switches 114 within the datacenter 100 may manage the flow of data between the components of the digital ledger access system 300 and external networks 116. These switches may support high-speed protocols such as InfiniBand® or Ethernet, enabling efficient data transfers between the system and external client devices. Redundancy mechanisms within the switches may ensure uninterrupted operation, even during hardware failures or high-demand scenarios.

External networks 116 may connect the datacenter-hosted digital ledger access system 300 to client devices, enabling users to interact with the system securely and efficiently. These networks may include public and private connections, such as VPNs or cloud-based services, which ensure secure communication channels for user authentication and data exchange.

By hosting the digital ledger access system 300 on the datacenter 100, the architecture may provide a robust platform for managing secure access to objects in the ledger. The combination of computational resources, scalable storage, and high-speed networking within the datacenter 100 may ensure that the system operates efficiently.

Example Server Device

FIG. 4 shows a schematic block diagram of example circuitry, some or all of which may be included in a digital ledger access server 410. In accordance with some example embodiments, digital ledger access server 410 may include various means, such as memory 401, processor 402, input/output circuitry 403, and/or communications circuitry 404.

Moreover, in some embodiments, digital ledger access circuitry 405 may also or instead be included in the digital ledger access server 410. For example, where digital ledger access circuitry 405 is included in digital ledger access server 410, digital ledger access circuitry 405 may be configured to facilitate the functionality discussed herein regarding generating, causing storage of, updating, and/or retrieving digital ledger access interface(s). An apparatus, such as digital ledger access server 410, may be configured, using one or more of circuitry 401-405, to execute the operations described above with respect to FIG. 3 and below in connection with FIGS. 5-7.

Although the use of the term "circuitry" as used herein with respect to components 401-405 are described in some cases using functional language, it should be understood that the particular implementations necessarily include the use of particular hardware configured to perform the functions associated with the respective circuitry as described herein. It should also be understood that certain of these components 401-405 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the digital ledger access server 410 may be housed within this device, while other components are housed within another of these devices, or by yet another device not expressly illustrated in FIG. 3.

While the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the digital ledger access server 410 may provide or supplement the functionality of particular circuitry. For example, the processor 402 may provide processing functionality, the memory 401 may provide storage functionality, the communications circuitry 404 may provide network interface functionality, and the like.

In some embodiments, the processor 402 (and/or co-processor or any other processing circuitry assisting or otherwise associated with the processor) may be in communication with the memory 401 via a bus for passing information among components of, for example, digital ledger access server 410. The memory 401 is non-transitory and may include, for example, one or more volatile and/or non-volatile memories, or some combination thereof. In other words, for example, the memory 401 may be an electronic storage device (e.g., a non-transitory computer readable storage medium). The memory 401 may be configured to store information, data, content, applications, instructions, or the like, for enabling an apparatus, e.g., digital ledger access server 410, to carry out various functions in accordance with example embodiments of the present disclosure.

Although illustrated in FIG. 4 as a single memory, memory 401 may comprise a plurality of memory components. The plurality of memory components may be embodied on a single computing device or distributed across a plurality of computing devices. In various embodiments, memory 401 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 401 may be configured to store information, data, applications, instructions, or the like for enabling digital ledger access server 410 to carry out various functions in accordance with example embodiments discussed herein. For example, in at least some embodiments, memory 401 is configured to buffer data for processing by processor 402. Additionally or alternatively, in at least some embodiments, memory 401 is configured to store program instructions for execution by processor 402. Memory 401 may store information in the form of static and/or dynamic information. This stored information may be stored and/or used by digital ledger access server 410 during the course of performing its functionalities.

Processor 402 may be embodied in a number of different ways and may, for example, include one or more processing devices configured to perform independently. Additionally, or alternatively, processor 402 may include one or more processors configured in tandem via a bus to enable independent execution of instructions, pipelining, and/or multi-threading. Processor 402 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 4 as a single processor, in some embodiments, processor 402 comprises a plurality of processors. The plurality of processors may be embodied on a single computing device or may be distributed across a plurality of such devices collectively configured to function as digital ledger access server 410. The plurality of processors may be in operative communication with each other and may be collectively configured to perform one or more functionalities of the digital ledger access server 410 as described herein.

In an example embodiment, processor 402 is configured to execute instructions stored in the memory 401 or otherwise accessible to processor 402. Alternatively, or additionally, the processor 402 may be configured to execute hard-coded functionality. As such, whether configured by hardware or software methods, or by a combination thereof, the processor 402 may represent an entity (e.g., physically embodied in circuitry) capable of performing operations according to an embodiment of the present disclosure while configured accordingly. Alternatively, as another example, when the processor 402 is embodied as an executor of software instructions, the instructions may specifically configure processor 402 to perform one or more algorithms and/or operations described herein when the instructions are executed. For example, these instructions, when executed by processor 402, may cause digital ledger access server 410 to perform one or more of the functionalities of digital ledger access server 410 as described herein.

In some embodiments, digital ledger access server 410 further includes input/output circuitry 403 that may, in turn, be in communication with processor 402 to provide an audible, visual, mechanical, or other output and/or, in some embodiments, to receive an indication of an input from a user, a client device 301A-301N, or another source. In that sense, input/output circuitry 403 may include means for performing analog-to-digital and/or digital-to-analog data conversions. Input/output circuitry 403 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 403 may comprise a user interface and may comprise a web user interface, a mobile application, a kiosk, or the like.

The processor 402 and/or user interface circuitry comprising the processor 402 may be configured to control one or more functions of a display or one or more user interface elements through computer-program instructions (e.g., software and/or firmware) stored on a memory accessible to the processor 402 (e.g., memory 401, and/or the like). In some embodiments, aspects of input/output circuitry 403 may be reduced as compared to embodiments where digital ledger access server 410 may be implemented as an end-user machine or other type of device designed for complex user interactions. In some embodiments (like other components discussed herein), input/output circuitry 403 may even be eliminated from digital ledger access server 410. Input/output circuitry 403 may be in communication with memory 401, communications circuitry 404, and/or any other component(s), such as via a bus. Although more than one input/output circuitry and/or other component can be included in digital ledger access server 410, only one is shown in FIG. 4 to avoid overcomplicating the disclosure (e.g., like the other components discussed herein).

Communications circuitry 404, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with digital ledger access server 410. In this regard, communications circuitry 404 may include, for example, a network interface for enabling communications with a wired or wireless communication network. For example, in some embodiments, communications circuitry 404 is configured to receive and/or transmit any data that may be stored by memory 401 using any protocol that may be used for communications between computing devices. For example, communications circuitry 404 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, communications circuitry 404 includes circuitry for interacting with the antenna(s) to cause transmission of signals via the antenna(e) or to handle receipt of signals received via the antenna(e). These signals may be transmitted by digital ledger access server 410 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 404 may additionally or alternatively be in communication with the memory 401, input/output circuitry 403 and/or any other component of digital ledger access server 410, such as via a bus.

In some embodiments, the digital ledger access circuitry 405 may also or instead be included and configured to perform the functionality discussed herein related to generating and updating a digital ledger access interface(s). In some embodiments, digital ledger access circuitry 405 includes hardware, software, firmware, and/or a combination of such components, configured to support various aspects of such digital ledger access interface-related functionality, features, and/or services of the digital ledger access server 410 as described herein (e.g., designed to generate a digital ledger access interface based on at least the validation of the classical public key for accessing the object which is determined by the digital ledger access system 400 and/or digital ledger access server 410). It should be appreciated that in some embodiments, the digital ledger access circuitry 405 performs one or more of such exemplary actions in combination with another set of circuitry of the digital ledger access server 410, such as one or more of memory 401, processor 402, input/output circuitry 403, and communications circuitry 404.

For example, in some embodiments, digital ledger access circuitry 405 utilizes processing circuitry, such as the processor 402 and/or the like, to perform one or more of its corresponding operations. In a further example, and in some embodiments, some or all of the functionality digital ledger access circuitry 405 may be performed by processor 402. In this regard, some or all of the example processes and algorithms discussed herein can be performed by at least one processor 402 and/or digital ledger access circuitry 405. It should also be appreciated that, in some embodiments, digital ledger access circuitry 405 may include a separate processor, specially configured field programmable gate array (FPGA), or application specific interface circuit (ASIC) to perform its corresponding functions.

Additionally or alternatively, in some embodiments, digital ledger access circuitry 405 utilizes memory 401 to store collected information. For example, in some implementations, digital ledger access circuitry 405 includes hardware, software, firmware, and/or a combination thereof, that interacts with at least one of the digital ledger repository 435, and/or memory 401 to send, retrieve, update, and/or store data values embodied by and/or associated with object data, quantum token data, acceptable classical public key data, access data, classical public key data, and associated data that is configured for association with, for example, generating and/or updating a digital ledger access interface, and to support the operations of the digital ledger access circuitry 405 and the remaining circuitry. Additionally or alternatively, in some embodiments, the digital ledger access circuitry 405 utilizes input/output circuitry 403 to facilitate user output (e.g., causing rendering of one or more user interface(s) such as a digital ledger access interface), and/or to receive user input (e.g., user clicks, user taps, keyboard interactions, user gesture, and/or the like). Additionally or alternatively still, in some embodiments, the digital ledger access circuitry 405 utilizes communications circuitry 404 to initiate transmissions to another computing device, receive transmissions from another computing device, communicate signals between the various sets of circuitry as depicted, and/or the like.

Accordingly, non-transitory computer readable storage media can be configured to store firmware, one or more application programs, and/or other software, which include instructions and/or other computer-readable program code portions that can be executed to control processors of the components of digital ledger access server 410 to implement various operations, including the examples shown herein. As such, a series of computer-readable program code portions may be embodied in one or more computer-program products and can be used, with a device, digital ledger access server 410, database, and/or other programmable apparatus, to produce the machine-implemented processes discussed herein. It is also noted that all or some of the information discussed herein can be based on data that is received, generated and/or maintained by one or more components of the digital ledger access server 410. In some embodiments, one or more external systems (such as a remote cloud computing and/or data storage system) may also be leveraged to provide at least some of the functionality discussed herein.

Example Operations for Accessing an Object in a Digital Ledger of Objects

The method, apparatus (e.g., communication access server 410), and computer-program product of an example embodiment will now be described in conjunction with the operations illustrated in FIGS. 5-7.

FIG. 5 depicts a flowchart that illustrates a series of operations or process blocks for determining an attempt to access the object and the provision or preclusion of access in response to a validation of the classical public key, in accordance with some example embodiments of the present disclosure. The operations illustrated in FIG. 5 may, for example, be performed by, with the assistance of, and/or under the control of one or more apparatuses, such as digital ledger access server 410, as described above. In this regard, performance of the operations may invoke one or more of memory 401, processor 402, input/output circuitry 403, communications circuitry 404, and/or digital ledger access circuitry 405. Certain operations may be considered optional, as indicated by the dashed lines.

As shown at operation 510, the apparatus (e.g., digital ledger access server 410) includes means, such as processor 402, input/output circuitry 403, communications circuitry 404, digital ledger access circuitry 405, and/or the like, for identifying an object from amongst a plurality of objects in the digital ledger of objects. By way of non-limiting example, an object may be identified by user input into a client device (e.g., client device 301A-301N), wherein the user input may include an identifier of a specific object within the digital ledger of objects. Such an identifier may be used to identify a specific object within a sequence of objects within the digital ledger of objects (e.g., a specific version of a sequence of objects), for which the user may have access to the specified object. In some embodiments, the user may not have access to the specifically identified object and this instance may be described in further detail below with respect to operation 560 and method 700 of FIG. 7.

In some embodiments, the object may be identified by the system (e.g., digital ledger access server 410 and/or digital ledger access system 400) based on a user's interaction with the digital ledger access server 410 and/or digital ledger access system 400 (e.g., via a client device 301A-301N), such as a user's input of user authentication data (e.g., a user's credentials like a username/user identifier and/or user-specific passcode such as a password). In some embodiments, the digital ledger access server 410 and/or digital ledger access system 400 may identify a single object and/or a plurality of objects that the user associated with the user authentication data may access. By way of non-limiting example, the identification of a plurality of objects that may be accessed by the user based on the user's authentication data may be likened to a single sign-on authentication.

In some embodiments, the digital ledger access server 410 and/or digital ledger access system 400 may identify a specific group of objects that may be likely for the user to access, such as by previous user interactions with the digital ledger access server 410 and/or digital ledger access system 400. For instance, the digital ledger access server 410 and/or digital ledger access system 400 may track (e.g., such as by a digital ledger access log based on a specific user and/or group of users within an organization) previous interactions with objects in the digital ledger of objects. In some embodiments, and based on these previous interactions, the digital ledger access server 410 and/or digital ledger access system 400 may present (e.g., by configuring a graphical user interface of the client device(s) 301A-301N) a list of potential objects the user may like to access, and such a list may be presented before and/or after the digital ledger access server 410 and/or digital ledger access system 400 has received user authentication data. Based on this list of potential objects, a user may select or identify an object.

As shown at operation 520, the apparatus (e.g., digital ledger access server 410) includes means, such as processor 402, input/output circuitry 403, communications circuitry 404, digital ledger access circuitry 405, and/or the like, for generating a quantum token for attachment with the object. By way of non-limiting example, a quantum token may be generated by the digital ledger access server 410 and/or digital ledger access system 400 by taking a stored quantum state, wherein the state is unknown to the recipient of the token and/or user of the public key, by which the quantum state cannot be copied without destroying or modifying the state the original quantum state. Although described herein with reference to generation of the quantum token by the digital ledger access server 410 and/or the digital ledger access system 400, the present disclosure contemplates that the quantum token may be generated by any technique or mechanism, such as an optical token generator, alone or in combination with any of the components described herein.

In some embodiments, once the quantum token has been generated, the quantum token may be attached to a specific object of the digital ledger of objects. By way of non-limiting example, during the generation of the quantum token, the quantum token may be specifically generated for a specific object to generate an object-specific quantum token, such that only a quantum token specifically generated for a specific object may be attached to said specific object. For instance, when the object-specific quantum token is being generated, an identifier or other data associated with the specific object may be used during the quantum token's generation and/or the identifier or other data associated with the specific object may be attached to the quantum token after generation. In some embodiments, once the object-specific quantum token has been generated, the object-specific quantum token may be stored (including the identifier and/or data of the associated specific object) in a repository, such as the digital ledger repository 235. In some embodiments, the object-specific quantum token may be stored with the specific object within the repository (e.g., digital ledger repository 235).

As shown at operation 530, the apparatus (e.g., digital ledger access server 410) includes means, such as processor 402, input/output circuitry 403, communications circuitry 404, digital ledger access circuitry 405, and/or the like, for deriving one or more classical public keys associated with the quantum token. By way of non-limiting example, the classical public key may be generated and/or derived based on the object-specific quantum token, wherein the classical public key may be generated by a certificate authority. In some embodiments, and once the classical public key has been generated, the classical public key may be associated with the quantum token of object-specific quantum token. In some embodiments, such an association may be stored in the digital ledger repository 235 by storing the classical public key with an identifier of the quantum token and/or storing the quantum token with an identifier of the classical public key(s).

In some embodiments, a plurality of classical public keys may be copied for multiple users and/or owners of an object associated with the object-specific quantum token, wherein the plurality of classical public keys may be a plurality of copies of the same classical public key which is distributed to the multiple users and/or owners. In some embodiments, a plurality of classical public keys may be generated for an object-specific quantum token of an object and then may be distributed to the multiple users and/or owners of the object. In such an embodiment, the plurality of classical public keys may be different for each user and/or owner of the classical public keys. In some embodiments, the digital ledger access server 410 and/or digital ledger access system 400 may track each of the quantum tokens for the digital ledger of objects and each associated classical public key for the objects, even in instances in which a plurality of classical public keys are generated for an object-specific quantum token.

In some embodiments, the digital ledger access server 410 and/or digital ledger access system 400 may generate a resolution of access for each classical public key, wherein a plurality of resolutions of access may be chosen in order to determine a resolution of access for a specific object. In some embodiments, the resolution access level may be associated with a specific classical public key, or the resolution access level may be associated with the object-specific quantum token, wherein once the classical public key is validated the object may be shown (e.g., illustrated, rendered, etc.) and/or accessed by the user at a specified resolution level (e.g., a resolution level may include a certain amount of pixels to clearly display or at least partially obscure the object).

As shown at operation 540, the apparatus (e.g., digital ledger access server 410) includes means, such as processor 402, input/output circuitry 403, communications circuitry 404, digital ledger access circuitry 405, and/or the like, for determining an attempt to access the object. By way of non-limiting example, a user of the digital ledger access server 410 and/or digital ledger access system 400 may seek to access an object of the digital ledger of objects by using a client device (e.g., client device 301A-301N) that is in communication with the digital ledger access server 410 and/or digital ledger access system 400.

By way of a non-limiting example, an attempt to access the object may include a user inputting in credentials (e.g., user authentication data) that may further include an identifier of a specific object the user may wish to view, modify (e.g., update and/or change data of the object), listen to, and/or interact with the object. In some embodiments, the digital ledger access server 410 and/or digital ledger access server 400 may take the user authentication data of the user, the identifier of the requested object by the user, and/or the classical public key of the user to determine if an attempt has been made.

In some embodiments, a user may use a single sign-on authentication method through the user's authentication data and the classical public key(s) associated with the user's authentication data to input into the digital ledger access server 410 and/or digital ledger access system 400. Such a single sign-on mechanism may be used to access a plurality of objects after the classical public key(s) have been validated, such that only one input of the user's authentication data and classical public key(s) are needed by the digital ledger access server 410 and/or digital ledger access system 400.

In some embodiments, and as shown at operation 550, the apparatus (e.g., communication access server 410) includes means, such as processor 402, input/output circuitry 403, communications circuitry 404, digital ledger access circuitry 405, and/or the like, for providing access to the object in response to a validation of the classical public key based on the quantum token. In some embodiments, and by way of non-limiting example, once a user has attempted to access an object of the digital ledger of objects., The user-provided classical public key may be validated by the digital ledger access server 410 and/or digital ledger access system 400 to provide access to the object, whereby the classical public key may be validated based on its association with the object-specific quantum token of the object to which the user is attempting access.

In some embodiments, and as shown at operation 560, the apparatus (e.g., communication access server 410) includes means, such as processor 402, input/output circuitry 403, communications circuitry 404, digital ledger access circuitry 405, and/or the like, for precluding access to the object in response to an invalidation of the classical public key based on the quantum token. In some embodiments, and by way of non-limiting example, once a user has attempted to access an object of the digital ledger of objects, the user-provided classical public key may be invalidated by the digital ledger access server 410 and/or digital ledger access system 400. The invalidation may occur based on the non-association of the classical public key provided by the user and the object-specific quantum token associated with the object the user sought to access. In some embodiments, the preclusion of access to the object may comprise a user's inability to view (e.g., fully view or view at a high resolution), listen, modify/change, and/or interact with the object in general.

In some embodiments, the preclusion of access may include a user's ability to view the object at a lower resolution (e.g., the resolution access level may be limited to lower pixel values for the object), such that a user may only view certain portions of the object. In some embodiments, the preclusion of access may include a user's ability to clearly see the object (e.g., at a specified resolution), but may include the user's inability to interact, modify and/or change the object. In some embodiments, the types of preclusion of access may be predetermined by the owner of the object and/or based upon each user's classical public key.

FIG. 6 depicts a flowchart that illustrates a series of operations or process blocks for session authentication, in accordance with some example embodiments of the present disclosure. The operations illustrated in FIG. 6 may, for example, be performed by, with the assistance of, and/or under the control of one or more apparatuses, such as digital ledger access server 410, as described above. In this regard, performance of the operations may invoke one or more of memory 401, processor 402, input/output circuitry 403, communications circuitry 404, and/or digital ledger access circuitry 405. Certain operations may be considered optional, as indicated by the dashed lines.

In some embodiments, and as shown at operation 610, the apparatus (e.g., digital ledger access server 410) includes means, such as processor 402, input/output circuitry 403, communications circuitry 404, digital ledger access circuitry 405, and/or the like, for authenticating a session of a user associated with the one or more classical public keys based on a user-specific passcode. By way of non-limiting example, and in some embodiments, the digital ledger access server 410 and/or digital ledger access system 400 may—after determining an attempt to access an object has occurred-authenticate a session of a user based on a user-specific passcode which may be included within the user authentication data input into the digital ledger access server 410 and/or digital ledger access system 400. In some embodiments, the user-specific passcode may be used in a single sign-on authentication method, such that the digital ledger access server 410 and/or digital ledger access system 400 may use the user-specific passcode to determine and/or access a plurality of classical public keys associated with the user which may be used to access a plurality of objects (and associated object-specific quantum token) associated with each classical public key. In this manner, once the user has inputted the user-specific code, the user may also access a plurality of objects that the user's associated classical public keys are determined to have access to without a separate verification process.

FIG. 7 depicts a flowchart that illustrates a series of operations or process blocks for modifying a mechanism by which access to the object is precluded, in accordance with some example embodiments of the present disclosure. The operations illustrated in FIG. 6 may, for example, be performed by, with the assistance of, and/or under the control of one or more apparatuses, such as digital ledger access server 410, as described above. In this regard, performance of the operations may invoke one or more of memory 401, processor 402, input/output circuitry 403, communications circuitry 404, and/or digital ledger access circuitry 405. Certain operations may be considered optional, as indicated by the dashed lines.

In some embodiments, and as shown at operation 510, the apparatus (e.g., digital ledger access server 410) includes means, such as processor 402, input/output circuitry 403, communications circuitry 404, digital ledger access circuitry 405, and/or the like, for determining a security priority for each of the objects of the plurality of objects. By way of non-limiting example, a security priority for each of the objects of the plurality of objects may comprise a certain security measure for each of the objects including, but not limited to: destroying the object, destroying all versions of the object within the digital ledger of objects, destroying the object and a certain plurality of previous versions of the object within the digital ledger of objects, alerting the owner of the object without destruction of the object, state collapse (e.g., of the photons/qubits used in the quantum token), and/or the like. In some embodiments, the security measure for each object may be predetermined by the owner(s) of the object and/or the plurality of versions of the objects within the digital ledger of objects (e.g., the entire chain of object versions).

In some embodiments, a security priority for each of the objects within the digital ledger of objects may be determined based at least in part upon a resource usage parameter associated with generating the specific object. In some embodiments, the resource usage parameter may be based on a power used to generate the object, which may include a human power to generate the object (e.g., difficulty associated with, or time devoted to generating the object); a computational power (e.g., the wattage used); time used to generate the object; and/or the like. In some embodiments, the larger the resource usage parameter used to generate the object, the greater the security priority. For example, a relatively high security parameter may include the full destruction of the object and/or the objects within the chain of object versions in response to an unauthorized attempt to access the object. By way of non-limiting example, the greater the security priority, the more likely the object may be destroyed if access is precluded by the digital ledger access server 410 and/or digital ledger access system 400 at operation 560 of FIG. 5. Similarly, if the security priority is lower (e.g., the resource usage parameter is less), then the less likely the object will be completely destroyed.

Although described herein with reference to destruction of the object or versions of the object, the present disclosure contemplates that the security priority may further influence any other characteristic or operation associated with the object. For example, a greater security priority may result in a more complex or sophisticated cryptographic technique used to secure the object. In some embodiments, the security priority may be based on the specific user associated with the quantum token and/or the object. The specific user may predetermine security priorities for each of their associated objects, individually or as a totality (e.g., all the objects associated with the user may include the same security priority).

In some embodiments, and as shown at operation 720, the apparatus (e.g., digital ledger access server 410) includes means, such as processor 402, input/output circuitry 403, communications circuitry 404, digital ledger access circuitry 405, and/or the like, for modifying a mechanism by which access to the object is precluded based upon the determined security priority for the object. By way of non-limiting example, the modification of a mechanism by which access to the object is precluded may include at least one of collapsing a state of the object (e.g., collapsing the qubits of the quantum token), generating a message interface object, generating an input request, and/or the like.

In some embodiments, the method for access to the object—based on the determined security priority of the object and based on the preclusion of access to the object—may be modified to include the collapsing of the state of the qubits used to generate the quantum token such that the object is also destroyed. In some embodiments, the method for access to the object-based on the determined security priority of the object and based on the preclusion of access to the object—may be modified to include the generation of a message interface object to be presented to a user of the digital ledger access server 410 and/or digital ledger access system 400 when the access of the object is precluded. In some embodiments, the message interface object may configure a graphical user interface of the client device(s) 301A-301N to request input by the user associated with the object for which the access request was denied, wherein the message interface object may alert the user that the object was attempted access by an unvalidated classical public key and/or request instructions from the user detailing how the digital ledger access server 410 and/or digital ledger access system 400 should handle the unvalidated access (e.g., destroy the object, change the quantum token, change the resolution access level of the object, and/or the like). In other words, the operations of FIG. 7 may operate to provide dynamic access preclusion based upon the particular user associated with an object, the type of access attempted by a user, the nature of the underlying object, etc.

Example Use Cases of Digital Ledger Access Server and Digital Ledger Access System In some embodiments, the digital ledger access server 410 and/or digital ledger access system 400 may be used in certain environments to promote privacy in certain technical fields. For instance, the digital ledger access server 410 and/or digital ledger access system 400 may be used for a digital ledger of objects associated with healthcare objects which may be interacted with by a plurality of healthcare providers to promote collaboration without losing previous iterations/versions of the healthcare objects. In some embodiments, the healthcare objects may include data regarding specific patients, specific medicinal data (e.g., data regarding patients in a medical trial for a specific drug), and/or the like, where data must be kept in real-time as it changes, but also previous iterations of historical data must be kept intact.

In some embodiments, the digital ledger access server 410 and/or digital ledger access system 400 may be used in certain environments to track what users and/or parties of users are accessing objects and attaching quantum tokens to objects. In some embodiments, this tracking of objects and their associated object-specific quantum tokens may be used to collect data on each instance of the accessing of objects.

In some embodiments, the digital ledger access server 410 and/or digital ledger access system 400 may be used in certain environments to trace objects and their specified versions—including versions comprising the updating of data—to track bugs and other impediments in the objects. In some embodiments, this use may also be used to trace back through versions to recreate and/or discover features within previous versions of the object that may have been involuntarily redacted or removed. By way of a particular example, a quantum token for a particular user may provide the ability for this user to monitor access to the data stored by the object, as related to self-sovereign data implementations or otherwise.

Thus, particular embodiments of the subject matter have been described. While this specification contains many specific implementation details, these should not be construed as limitations on the scope of any disclosures or of what may be claimed, but rather as description of features specific to particular embodiments of particular disclosures. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any optional step shown in broken lines in one or more flow diagrams illustrated herein are optional for purposes of the depicted embodiment.

In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Conclusion

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, comprising:

receiving, from a user, a classical public key to access an object in a digital ledger of objects, wherein the object is associated with an object-specific quantum token;

validating the classical public key based on the object-specific quantum token, wherein validating further comprises determining a resolution access level for the object, wherein the resolution access level corresponds to one of a plurality of resolution access levels associated with the object; and providing access to the object at the resolution access level in response to the validation of the classical public key, wherein providing access to the object at the resolution access level comprises modifying a display resolution of the object.

2. The method of claim 1, wherein the method further comprises:

identifying the object from amongst a plurality of objects in the digital ledger of objects;

generating a quantum token for attachment with the object, wherein the quantum token is the object-specific quantum token for the object; and deriving one or more classical public keys associated with the quantum token, wherein the classical public key is one of the one or more classical public keys.

3. The method according to claim 2, wherein the plurality of objects comprises multi-dimensional digital assets capable of being accessed, viewed, or interacted with in a virtual reality or augmented reality platform, wherein ownership of the multi-dimensional digital assets is secured using object-specific quantum tokens and associated classical public keys.

4. The method according to claim 2, wherein each object of the plurality of objects is associated with a corresponding object-specific quantum token.

5. The method according to claim 2, wherein, in precluding access to the object, the method further comprises:

determining a security priority for each object; and modifying a mechanism by which access to each object is precluded based upon the corresponding determined security priority.

6. The method according to claim 5, wherein the security priority for each object is determined based on a resource usage parameter associated with generating the corresponding object.

7. The method according to claim 5, wherein the security priority for each of object is determined based on the user associated with the quantum token attached with the corresponding object.

8. The method according to claim 5, wherein precluding access to the object comprises at least one of limiting the display resolution of the object, restricting user access to one or more portions of the object, collapsing a quantum state of the object-specific quantum token, generating a message interface object indicating a validity of the one or more classical public keys, or generating an input request to be provided to the user associated with the object.

9. The method according to claim 1, wherein the method further comprises:

precluding access to the object in response to an invalidation of the classical public key based on the quantum token; and transmitting an alert to an owner of the object that the object was attempted access by an invalidated classical public key.

10. The method according to claim 1, wherein the method further comprises:

detecting that the user is attempting to generate an unauthorized copy of the object; and precluding the unauthorized copying by invalidating the associated classical public key, collapsing a quantum state of the object-specific quantum token, or rendering the object inaccessible in the digital ledger.

11. An apparatus, comprising:

at least one processor; and at least one memory, the at least one memory having computer-code instructions stored thereon that, when executed by the at least one processor, causes the apparatus to:

receive, from a user, a classical public key to access an object in a digital ledger of objects, wherein the object is associated with an object-specific quantum token;

validate the classical public key based on the object-specific quantum token, wherein validating further comprises determining a resolution access level for the object, wherein the resolution access level corresponds to one of a plurality of resolution access levels associated with the object; and provide access to the object at the resolution access level in response to the validation of the classical public key, wherein providing access to the object at the resolution access level comprises modifying a display resolution of the object.

12. The apparatus according to claim 11, wherein the computer-code instructions, when executed by the at least one processor, causes the apparatus to:

identify the object from amongst a plurality of objects in the digital ledger of objects;

generate a quantum token for attachment with the object, wherein the quantum token is the object-specific quantum token for the object; and derive one or more classical public keys associated with the quantum token, wherein the classical public key is one of the one or more classical public keys.

13. The apparatus according to claim 12, wherein the plurality of objects comprises multi-dimensional digital assets capable of being accessed, viewed, or interacted with in a virtual reality or augmented reality platform, wherein ownership of the multi-dimensional digital assets is secured using object-specific quantum tokens and associated classical public keys.

14. The apparatus according to claim 12, wherein each object of the plurality of objects is associated with a corresponding object-specific quantum token.

15. The apparatus according to claim 11, wherein the computer-code instructions, when executed by the at least one processor, causes the apparatus to:

preclude access to the object in response to an invalidation of the classical public key based on the quantum token; and transmit an alert to an owner of the object that the object was attempted access by an invalidated classical public key.

16. A computer program product, the computer program product comprising a non-transitory computer-readable medium comprising code configured to cause an apparatus to:

receive, from a user, a classical public key to access an object in a digital ledger of objects, wherein the object is associated with an object-specific quantum token;

validate the classical public key based on the object-specific quantum token, wherein validating further comprises determining a resolution access level for the object, wherein the resolution access level corresponds to one of a plurality of resolution access levels associated with the object; and provide access to the object at the resolution access level in response to the validation of the classical public key, wherein providing access to the object at the resolution access level comprises modifying a display resolution of the object.

17. The computer program product according to claim 16, wherein the code further causes the apparatus to:

identify the object from amongst a plurality of objects in the digital ledger of objects;

generate a quantum token for attachment with the object, wherein the quantum token is the object-specific quantum token for the object; and derive one or more classical public keys associated with the quantum token, wherein the classical public key is one of the one or more classical public keys.

18. The computer program product according to claim 17, wherein the plurality of objects comprises multi-dimensional digital assets capable of being accessed, viewed, or interacted with in a virtual reality or augmented reality platform, wherein ownership of the multi-dimensional digital assets is secured using object-specific quantum tokens and associated classical public keys.

19. The computer program product according to claim 17, wherein each object of the plurality of objects is associated with a corresponding object-specific quantum token.

20. The computer program product according to claim 16, wherein the code further causes the apparatus to:

preclude access to the object in response to an invalidation of the classical public key based on the quantum token; and transmit an alert to an owner of the object that the object was attempted access by an invalidated classical public key.

* * * * *